United States Patent [19]

Loeffler et al.

[11] Patent Number: 4,988,802
[45] Date of Patent: Jan. 29, 1991

[54] REACTIVE DYES WITH THREE REACTIVE GROUPS

[75] Inventors: Hermann Loeffler, Speyer; Manfred Patsch, Wachenheim, both of Fed. Rep. of Germany

[73] Assignee: BASF Aktiengesellschaft, Ludwigshafen, Fed. Rep. of Germany

[21] Appl. No.: 483,647

[22] Filed: Feb. 23, 1990

[30] Foreign Application Priority Data

Mar. 13, 1989 [DE] Fed. Rep. of Germany ....... 3908074

[51] Int. Cl.$^5$ .................... C09B 62/03; C09B 62/09; C09B 62/17; C09B 62/25; C09B 62/41
[52] U.S. Cl. .................... 534/634; 534/632; 534/633; 534/887; 544/208
[58] Field of Search ............. 534/632, 633, 634, 637

[56] References Cited

U.S. PATENT DOCUMENTS 3,100,767 8/1963 Gunst .................. 534/637 X
3,233,470 12/1965 Boedeker et al. ......... 534/637 X
3,349,074 10/1967 Andrew ................. 534/634 X
4,485,041 11/1984 Hoyer et al. ............ 534/637

OTHER PUBLICATIONS

Sumitomo, Chemical Abstracts, vol. 103, 72613v (1985).
Matsui et al., Journal of the Society of Dyers and Colourists, vol. 104, No. 11, Nov., 1988, pp. 425–431.

Primary Examiner—Floyd D. Higel
Assistant Examiner—Fiona T. Powers
Attorney, Agent, or Firm—Oblon, Spivak, McClelland, Maier & Neustadt

[57] ABSTRACT

Reactive dyes which possess three reactive groups and conform to the formula

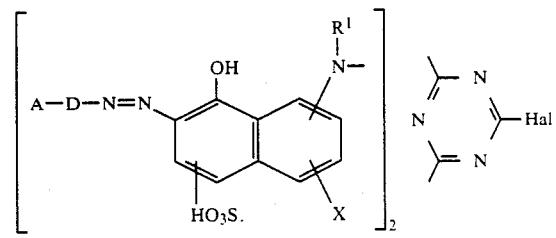

where
$R^1$ is hydrogen, methyl or ethyl,
X is hydrogen or hydroxysulfonyl,
Hal is fluorine or chlorine,
D is phenylene, carboxyl- hydroxysulfonyl-monosubstituted or -disubstituted phenylene or hydroxysulfonylmonosubstituted or -disubstituted naphthylene, and
A is a reactive group which reacts only substitutively with the hydroxyl groups of the cellulose, or A—D together are a benzo-fused reactive group which reacts only substitutively with the hydroxyl groups of the cellulose, are used for dyeing or printing hydroxyl- or nitrogen-containing substrates.

3 Claims, No Drawings

REACTIVE DYES WITH THREE REACTIVE GROUPS

The present invention relates to novel reactive dyes which possess three reactive groups and conform to the formula I

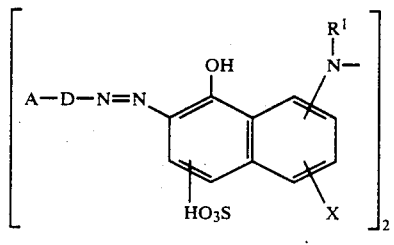

where
- $R^1$ is hydrogen, methyl or ethyl,
- X is hydrogen or hydroxysulfonyl,
- Hal is fluorine or chlorine,
- D is phenylene, carboxyl- or hydroxysulfonyl-monosubstituted or -disubstituted phenylene or hydroxysulfonyl-monosubstituted or -disubstituted naphthylene, and
- A is a reactive group which reacts only substitutively with the hydroxyl- or nitrogen-containing groups of the substrates to be treated, or A—D together are a benzofused reactive group which reacts only substitutively with the hydroxyl- or nitrogen- containing groups of the substrates to be treated.

DE-A-2 748 965 and DE-A-2 748 966 already disclose reactive dyes which are similar to those of the formula I. However, they differ in that there the reactive group A reacts additively with the hydroxyl- or nitrogen-containing groups of the substrates to be treated.

Furthermore, JP-A-69 163/1985 describes reactive dyes which differ from those of the formula I in that there the reactive group A is a double attachment group which reacts not only additively but also substitutively with the hydroxyl- or nitrogen-containing groups of the substrates to be treated.

It has been found that the prior art dyes still have application defects. For instance, the dyes described in JP-A-69 163/1985 either lack resistance to alkaline and-/or peroxide-containing detergent compositions, or their color yield at the customary dyeing temperature is too low (see J.S.D.C. 104 (1988), 425–431).

It is an object of the present invention to provide new reactive dyes which have advantageous properties, in particular a high degree of fixation and high wet fastness properties.

We have found that this object is achieved by the reactive dyes of the formula I defined in more detail at the beginning.

The fact that the reactive group A reacts substitutively with the hydroxyl- or nitrogen-containing groups of the substrates to be treated means that the leaving groups or atoms (e.g. fluorine or chlorine) in the reactive group A are replaced by the relevant groups in the substrates, e.g. by the hydroxyl groups of cellulose, in accordance with the following scheme:

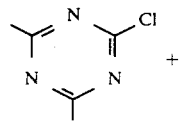

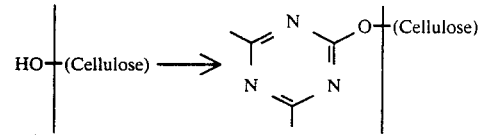

D is for example

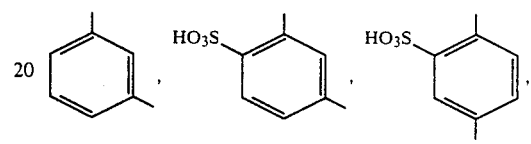

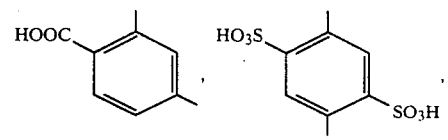

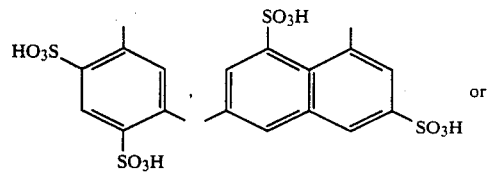

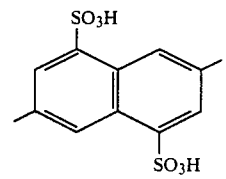

Reactive groups A which react only substitutively with the hydroxyl- or nitrogen-containing groups of the substrates to be treated are for example halogen-substituted radicals of 1,3,5-triazine, of quinoxaline, of phthalazine, of pyrimidine or of pyridazone. Specific examples are the following radicals:

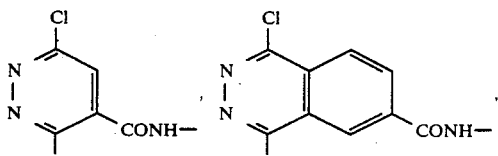

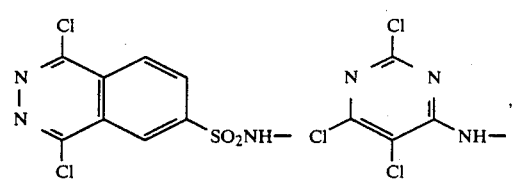

-continued

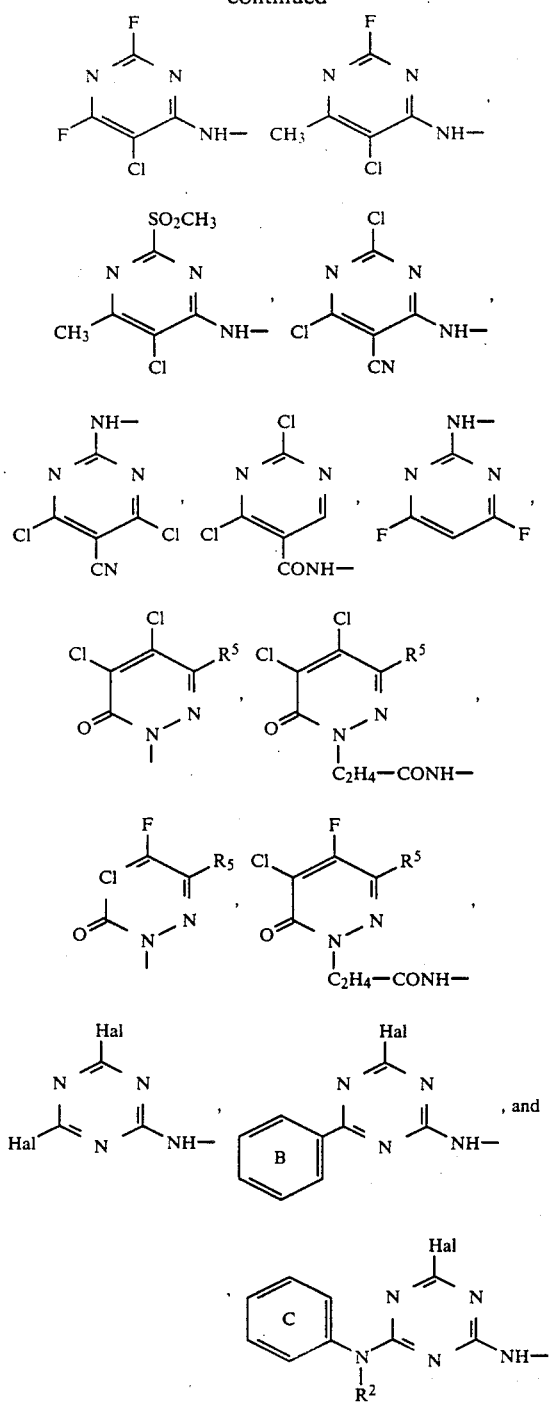

where Hal is flourine or chlorine, $R^5$ is hydrogen or nitro, $R^2$ is hydrogen or $C_1$-$C_4$-alkyl, the rings B and C may each be substituted by hydroxysulfonyl, and independently thereof the ring C may be substituted by chlorine, nitro, by up to two methoxy groups or by up to three $C_1$-$C_4$-alkyl groups.

A benzo-fused reactive group A-D which reacts substitutively with the hydroxyl- or nitrogen-containing groups of the substrates to be treated is for example a 2-alkylsulfonylbenzothiazole radical. Specific examples are the radicals

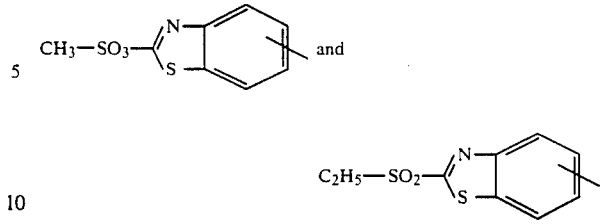

Radicals of the coupling components of the formula

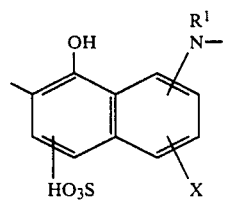

are for example

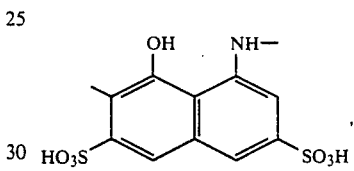

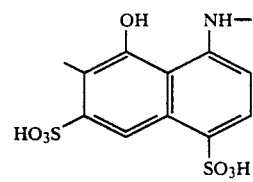

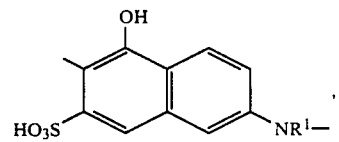

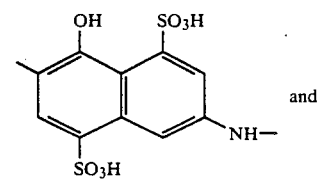

where $R^1$ is hydrogen, methyl or ethyl.

Preference is given to reactive dyes of the formula I where A is a radical of the formula

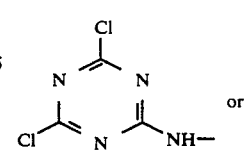

or

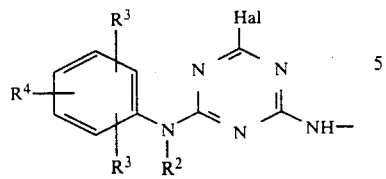

where $R^2$ is hydrogen or $C_1$-$C_4$-alkyl, $R^3$ is hydrogen, $C_1$-$C_4$-alkyl or $C_1$-$C_4$-alkoxy, $R^4$ is hydrogen, $C_1$-$C_4$-alkyl or hydroxysulfonyl, and Hal is fluorine or chlorine.

Preference is further given to reactive dyes of the formula I where D is the radical

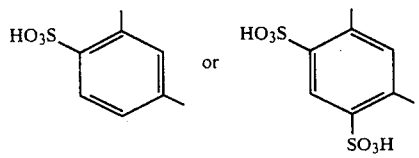

Preference is further given to reactive dyes of the formula I where the radical

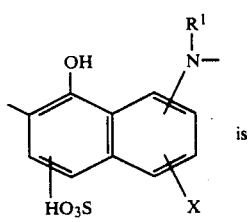

is

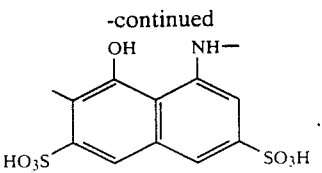

Particular preference is given to reactive dyes which conform to the formula Ia

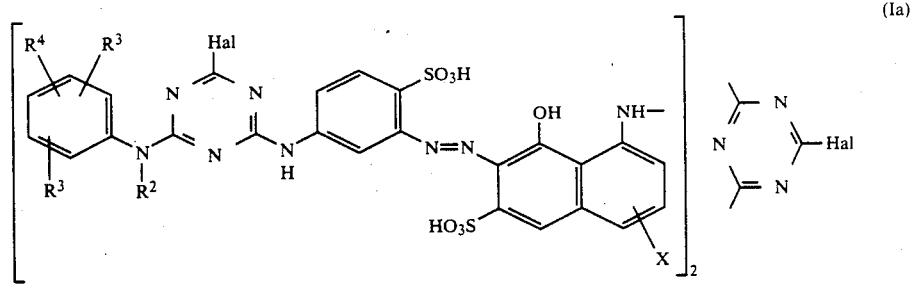

(Ia)

where
Hal is fluorine or chlorine,
$R^2$ is hydrogen or $C_1$-$C_4$-alkyl,
X is hydrogen or hydroxysulfonyl,
$R^3$ is hydrogen, $C_1$-$C_4$-alkyl or $C_1$-$C_4$-alkoxy and
$R^4$ is hydrogen, $C_1$-$C_4$-alkyl or hydroxysulfonyl.

Particular preference is further given to reactive dyes which conform to the formula Ib

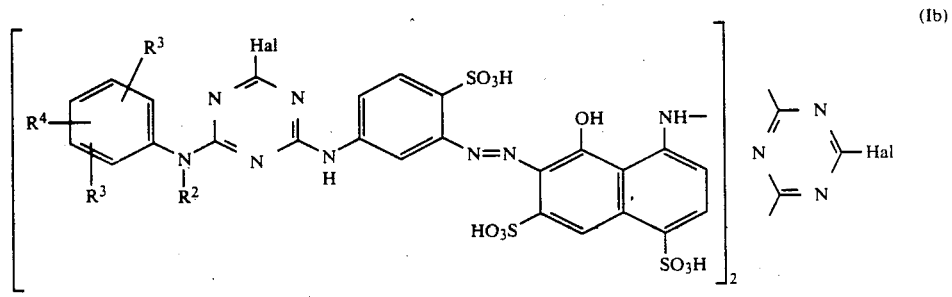

(Ib)

where $R^2$, $R^3$, $R^4$ and Hal are each as defined above.

Of particular note are the reactive dyes of the formula Ia where $R^2$ and $R^3$ are each hydrogen and $R^4$ is hydroxysulfonyl or where $R^2$ is hydrogen, $R^3$ is o,o'-$C_1$-$C_2$-alkyl, and $R^4$ is methyl or hydrogen.

The novel reactive dyes of the formula I are prepared in a manner known per se, for example by diazotizing (a) an amine of the formula II $$A-D-NH_2 \qquad (II),$$

where A and D are each as defined above, and coupling it with a coupling component of the formula III

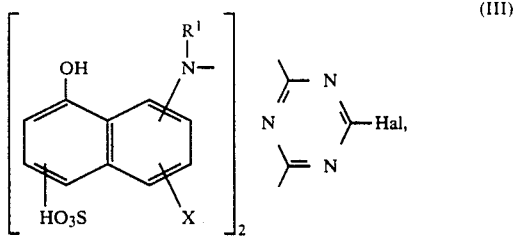

where $R^1$, X and Hal are each as defined above.

A further method comprises for example diazotizing (b) an amine of the formula IV

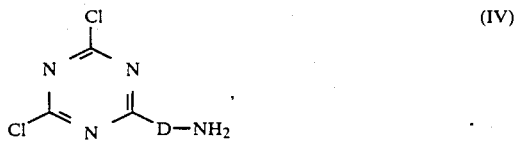

where D is as defined above, coupling it with a coupling component III and then if desired reacting the product with an aniline derivative of the formula V

where $R^2$ and the ring C are each as defined above.

A further method comprises for example reacting (c) the dye of the formula VI

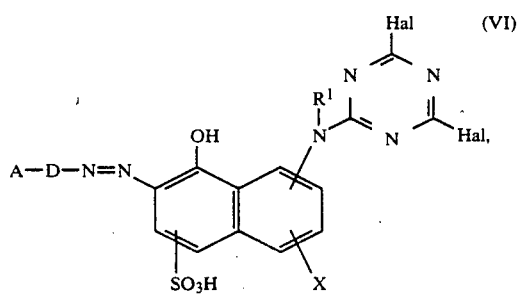

where Hal, A, D, $R^1$ and X are each as defined above, with a further dye of the formula VII

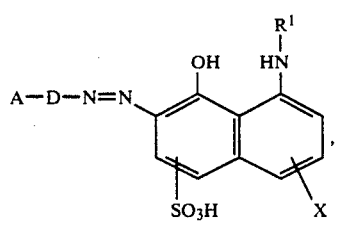

where A, D, $R^1$ and X are each as defined above.

If asymmetrical reactive dyes of the formula I are to be prepared, it is advisable to adopt method (a) or method (c). For instance, method (a) can be carried out with a coupling component of the formula III where two different aminonaphtholsulfonic acids are attached to the triazine ring. In the case of (c) it is possible for example to use a dye VII based on an aminonaphtholsulfonic acid which is different from that present in the dye of the formula VI.

Preferably, the dyes according to the present invention are prepared by method (a).

The novel reactive dyes of the formula I are advantageous for dyeing or printing hydroxyl- or nitrogen-containing organic substrates. Such substrates are for example leather and fiber material which predominantly contains natural or synthetic polyamides or natural or regenerated cellulose. The novel dyes are preferred for dyeing and printing of textile material based on cotton. Used in this way, they exhibit high degrees of fixation and high wet fastness properties.

The Examples which follow will further illustrate the invention.

EXAMPLE 1

(a) A solution of 0.5 mol of 1-aminonaphth-8-ol-3,6-disulfonic acid in 400 ml of water and 30 ml of 50% strength by weight sodium hydroxide solution was added to a thoroughly stirred mixture of 96.0 g of cyanuric chloride, 500 ml of ice-water and 2 ml of 30% strength by weight hydrochloric acid, and the stirring was continued at 5°–8° C. for three hours until the aminonaphthalene was completely dissolved and acylated. This solution was again poured into a solution of the sodium salt of 1-aminonaphth-8-ol-3,6-disulfonic acid in the above amount and concentration, and the mixture was brought to pH 5 by warming to 20°–25° C. and sprinkling in 105 g of sodium bicarbonate. The mixture was stirred under these conditions for three hours and diluted with 1,000 ml of water to complete the condensation. The precipitation of the 2,6-[bis(8-hydroxy-3,6-dihydroxysulfonylnaphth-1-yl-amino-]-4-chloro-s-triazine formed was completed with 700 g of sodium chloride. The product was then filtered off with suction and washed with 20% strength by weight sodium chloride solution, the yield being 95%.

(b) 20.3 g (0.05 mol) of 2-(N-methyl-N-phenylamino)-4-chloro-6-(3'-amino-4'-hydroxysulfonylphenylamino)-s-triazine were dissolved with sodium bicarbonate in 250 ml of water at pH 7 and admixed with 15 ml of 3.33N sodium nitrite solution. Diazotization was effected by slowly pouring this solution into 100 g of ice and 15 ml of 30% strength by weight hydrochloric acid. After stirring for one hour in the cold, the excess nitrous acid was destroyed with amidosulfuric acid, and the yellowish, jellylike solution was run off into a suspension of 0.024 mol of the binary coupling component a) in 250 ml of water, 100 g of ice and 15 g of sodium bicarbonate. The resulting and completely dissolved dye of the formula

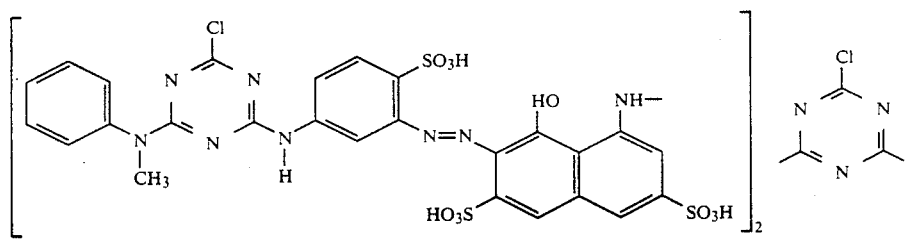

was precipitated with 100 g of sodium chloride, washed with 3% strength by weight sodium chloride solution and then with acetone and dried at 40° C. under reduced pressure.

The dye thus obtained, on application from an alkaline bath at elevated temperature, dyes cellulose materials in a high dye yield in bluish red shades having good wet fastness properties.

coupled similarly to Example 1b onto 0.024 mol of 2,6-[bis(8-hydroxy-3,4-hydroxysulfonylnaphth-1-ylamino)]-4-chloro-s-triazine which had been obtained as described in Example 1a from two equivalents of 1-aminonaphth-8-ol-3,4-disulfonic acid and one equivalent of cyanuric chloride.

The resulting dissolved dye of the formula

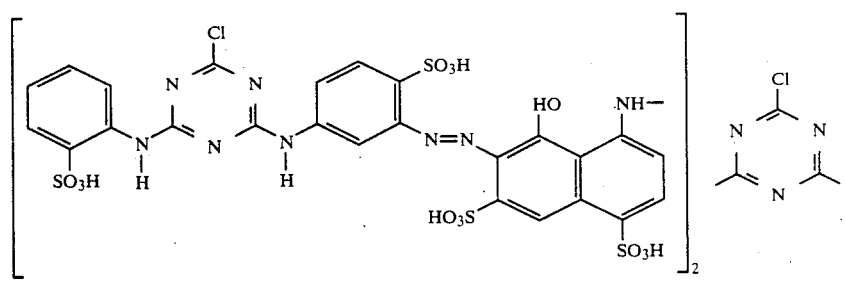

EXAMPLE 2

23.6 g of 2-(2'-hydroxysulfonylphenylamino)-4-chloro-6-(3''-amino-4'-hydroxysulfonylphenylamino)-s-triazine were dissolved with sodium bicarbonate in 300 ml of water at pH 6, and the solution was cooled with 100 g of ice and admixed with 15 ml of 3.33N sodium nitrite solution. The diazotization was then carried out by pouring in 15 ml of 30% strength by weight hydrochloric acid in one portion and subsequently stirring for an hour. After the excess nitrous acid had been destroyed with amidosulfuric acid, the diazo product was precipitated with 150 g of sodium chloride, washed with 15% strength by weight sodium chloride solution and then with acetone and dried at 40° C. under reduced pressure.

Applied from an alkaline bath at elevated temperature it dyes cellulose materials in a very high color yield in red shades having good wet fastness properties.

Table 1 which follows lists symmetrical dyes of the formula

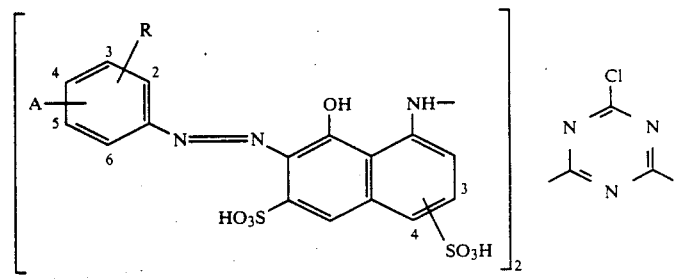

which are obtained in a similar manner. They likewise produce dyeings to a very high degree of fixation with good wet fastness properties.

TABLE 1

| Example No. | A | R | 3-/4-SO$_3$H | Hue on cotton |
|---|---|---|---|---|
| 3 | ![structure: 5-phenyl-N(CH3)-C(=N)-N=C(Cl)-N=C-NH−] | 2-SO$_3$H | 4 | Red |

TABLE 1-continued

| Example No. | A | R | 3-/4-SO₃H | Hue on cotton |
|---|---|---|---|---|
| 4 | 5-(2-SO₃H-phenyl-NH)-C(=N-)-N=C(Cl)-N=C-NH— (triazine with 2-SO₃H phenyl) | 2-SO₃H | 3 | Bluish red |
| 5 | 5-(4-SO₃H-phenyl-NH)-triazinyl-Cl-NH— | 2-SO₃H | 3 | Bluish red |
| 6 | 5-(4-SO₃H-phenyl-NH)-triazinyl-Cl-NH— | 2-SO₃H | 4 | Red |
| 7 | 5-(phenyl-N(C₂H₅))-triazinyl-Cl-NH— | 2-SO₃H | 4 | Red |
| 8 | 5-(phenyl-N(C₂H₅))-triazinyl-Cl-NH— | 2-SO₃H | 3 | Bluish red |
| 9 | 5-(2,4,6-trimethylphenyl-NH)-triazinyl-Cl-NH— | 2-SO₃H | 3 | Bluish red |
| 10 | 5-(2,6-dimethylphenyl-NH)-triazinyl-Cl-NH— | 2-SO₃H | 4 | Red |
| 11 | 5-(phenyl-N(C₂H₅))-triazinyl-F-NH— | 2-SO₃H | 3 | Bluish Red |

TABLE 1-continued

| Example No. | A | R | 3-/4-SO₃H | Hue on cotton |
|---|---|---|---|---|
| 12 | 5-[2,6-disubstituted phenyl (2-CH₃, 6-C₂H₅) NH-C(=N-)-N=C(Cl)-N=C(NH—)] triazine | 2-SO₃H | 3 | Bluish Red |
| 13 | 5-[2-methylphenyl N(CH₃)-C(=N-)-N=C(Cl)-N=C(NH—)] triazine | 2-SO₃H | 3 | Bluish Red |
| 14 | 5-[phenyl-C(=N-)-N=C(Cl)-N=C(NH—)] triazine | 2-SO₃H | 3 | Bluish red |
| 15 | 5-[2-SO₃H-phenyl-NH-C(=N-)-N=C(F)-N=C(NH—)] triazine | 2-SO₃H | 4 | Red |
| 16 | 5-[F,Cl-substituted pyrimidine with NH—] | 2-SO₃H | 4 | Red |
| 17 | 5-[F,Cl-substituted pyrimidine with NH—] | 2-SO₃H | 3 | Bluish red |
| 18 | 5-[F,CH₃,Cl-substituted pyrimidine with NH—] | 2-SO₃H | 4 | Red |
| 19 | 5-[4,5-dichloro-6-oxo-3-carboxy-pyridazin-1-yl-C₂H₄-CONH—] | 2-SO₃H | 4 | Red |

TABLE 1-continued

| Example No. | A | R | 3-/4-SO$_3$H | Hue on cotton |
|---|---|---|---|---|
| 20 | 5- (4-chloro-5-fluoro-6-oxo-1-methyl-pyridazin-3-yl) | 2-SO$_3$H | 3 | Bluish red |
| 21 | (4-chloro-5-fluoro-6-oxo-1-methyl-pyridazin-3-yl) | 4-SO$_3$H | 3 | Bluish red |
| 22 | 5- (3-sulfophenylamino-chloro-triazinyl-amino) | 2-SO$_3$H | 4 | Red |
| 23 | 5- (dichloro-triazinyl-amino) | 2-SO$_3$H | 4 | Red |
| 24 | 4- (N-ethyl-benzyl-chloro-triazinyl-amino) | 2-SO$_3$H | 3 | Violet |
| 25 | 5- (N-ethyl-phenyl-chloro-triazinyl-amino) | H | 3 | Violet |

One equivalent each of 1-aminonaphth-8-ol-3,6-disulfonic acid and cyanuric chloride and a further equivalent of 1-aminonaphth-8-ol-4,6-disulfonic acid were combined by the method of Example 1a to obtain a mixed-substituted 2,6-diamino-4-chloro-s-triazine. The hues of the dyes obtained with the diazo components of the previous Examples and this coupling component are between those of the symmetric dyes already described. For instance, the hue of Example 26 is between that of Examples 1 and 3 and constitutes a slightly bluish red. The degrees of fixation and the wet fastness properties are similar to those of the preceding Examples.

Table 2 below lists dyes which conform to the formula

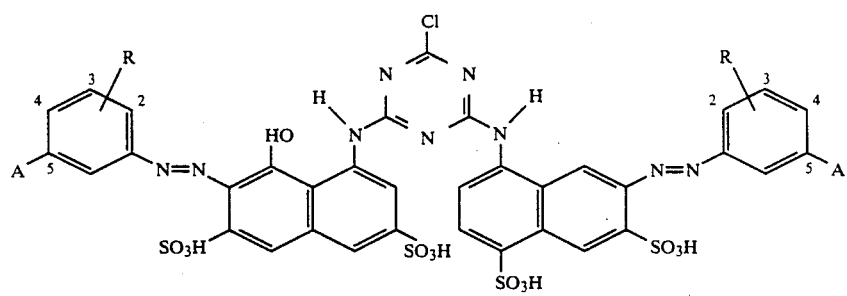

TABLE 2

| Example No. | A | R |
|---|---|---|
| 26 | phenyl-N(CH₃)-C(=N-)-N=C(Cl)-N=C(NH—) triazine derivative | 2-SO₃H |
| 27 | phenyl-N(C₂H₅)-C(=N-)-N=C(Cl)-N=C(NH—) triazine derivative | 2-SO₃H |
| 28 | 2-(SO₃H)phenyl-NH-C(=N-)-N=C(Cl)-N=C(NH—) | 2-SO₃H |
| 29 | 4-(HO₃S)phenyl-NH-C(=N-)-N=C(Cl)-N=C(NH—) | 2-SO₃H |
| 30 | phenyl-N(CH₃)-C(=N-)-N=C(F)-N=C(NH—) | 2-SO₃H |
| 31 | 4,5-dichloro-3-nitro-6-oxo-pyridazinyl-C₂H₄CONH— | 2-SO₃H |
| 32 | 3-(HO₃S)phenyl-NH-C(=N-)-N=C(Cl)-N=C(NH—) | 2-SO₃H |
| 33 | 5-chloro-6-fluoro-2-fluoropyrimidin-4-yl-NH— | 2-SO₃H |
| 34 | 2-methyl-5-tert-butyl-phenyl-NH-C(=N-)-N=C(Cl)-N=C(NH—) | 2-SO₃H |
| 35 | 2-methylphenyl-N(C₂H₅)-C(=N-)-N=C(Cl)-N=C(NH—) | 2-SO₃H |

EXAMPLE 33

119.5 g of the sodium salt of 2-aminonaphth-5-ol-7-sulfonic acid were dissolved in 1,000 ml of water. This solution was added to a suspension of 90 g of cyanuric chloride in 750 ml of ice-water, and the mixture was brought to pH 3 with sodium bicarbonate. After stirring at 0°–5°C. for one hour, the mixture was filtered and the filtrate was admixed with the same amount (as described above) of the sodium salt of 2-aminonaphth-5-ol-7-sulfonic acid in the form of a solution. The mixture was brought to pH 6 with sodium bicarbonate and stirred at room temperature overnight to complete the condensation.

Coupling a tenth of this batch with the diazonium salt of 47.3 g of 2-(4',-hydroxysulfonylphenylamino)-4-chloro-6-(3'-amino-4'-hydroxysulfonylphenylamino)-s-triazine as described in Example 1b gave a dye of the formula

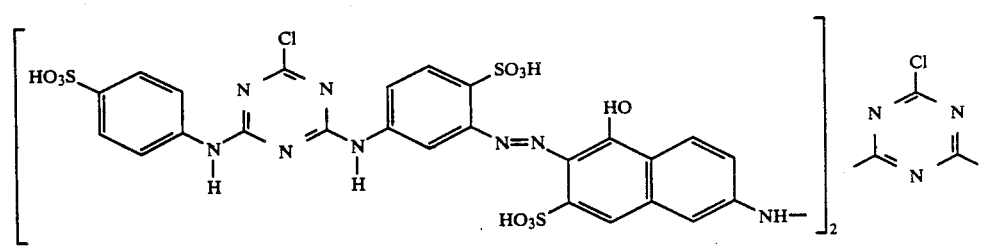

which, on application from an alkaline bath at elevated temperature, dyes cellulose materials in orange shades in a high degree of fixation to a high wet fastness level.

Table 3 below lists dyes which are obtained in a similar manner and which dye cellulose in the same shade with similar properties.

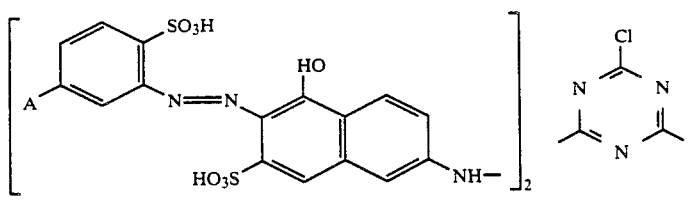

| TABLE 3 | | |
|---|---|---|
| Example No. | A | R |
| 37 | 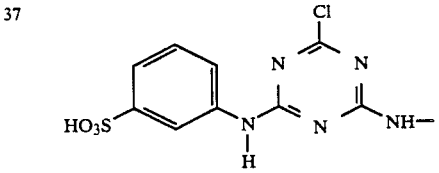 | |
| 38 | 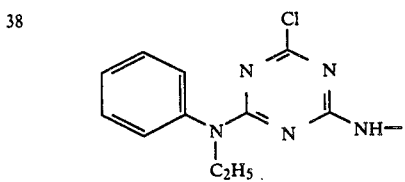 | |
| 39 | 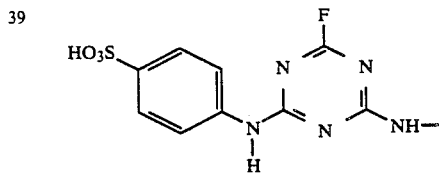 | |

| TABLE 3-continued | | |
|---|---|---|
| Example No. | A | R |
| 40 | 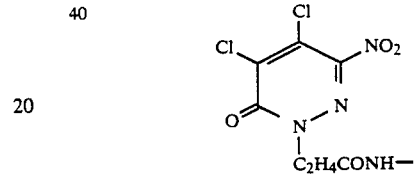 | |
| 41 | 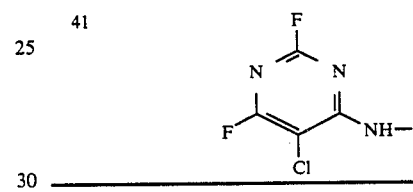 | 2-SO$_3$H |

One equivalent each of 1-amino-naphth-8-ol-3,6-disulfonic acid or 1-aminonaphth-8-ol-4,6-disulfonic acid and cyanuric chloride and one equivalent of 2-amino-naphth-5-ol-7-sulfonic acid were combined by the method of Example 1a to obtain further asymmetrical, binary coupling components which, used as in the procedure described above, produced the dyes listed in Table 4 which likewise have high degrees of fixation and good wet fastness properties.

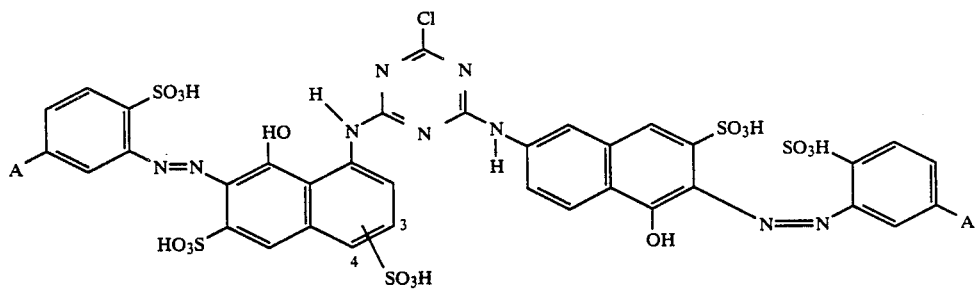

| TABLE 4 | | | |
|---|---|---|---|
| Example No. | A | 3-/4-SO$_3$H | Hue on cotton |
| 42 | 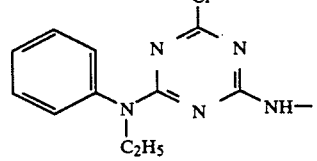 | 3 | Red |

TABLE 4-continued

| Example No. | A | 3-/4-SO$_3$H | Hue on cotton |
|---|---|---|---|
| 43 | phenyl-N(CH$_3$)-C(=N-)-N=C(F)-N=C(NH—)- triazine | 3 | Red |
| 44 | phenyl-N(C$_2$H$_5$)-C(=N-)-N=C(Cl)-N=C(NH—)- triazine | 4 | Yellowish red |
| 45 | (2-SO$_3$H-phenyl)-NH-C(=N-)-N=C(Cl)-N=C(NH—)- triazine | 4 | Yellowish red |
| 46 | (2-CH$_3$-phenyl)-N(CH$_3$)-C(=N-)-N=C(Cl)-N=C(NH—)- triazine | 3 | Red |
| 47 | (2-CH$_3$,6-C$_2$H$_5$-phenyl)-NH-C(=N-)-N=C(Cl)-N=C(NH—)- triazine | 3 | Red |
| 48 | 4,5-dichloro-3-nitro-6-oxo-pyridazine-N-C$_2$H$_4$CONH— | 3 | Red |
| 49 | 2-F, 5-Cl, 6-F-pyrimidine-4-NH— | 4 | Yellowish red |
| 50 | (2,6-dimethyl-4-CH$_3$-phenyl)-NH-C(=N-)-N=C(Cl)-N=C(NH—)- triazine | 4 | Yellowish red |

TABLE 4-continued

| Example No. | A | 3-/4-SO₃H | Hue on cotton |
|---|---|---|---|
| 51 | 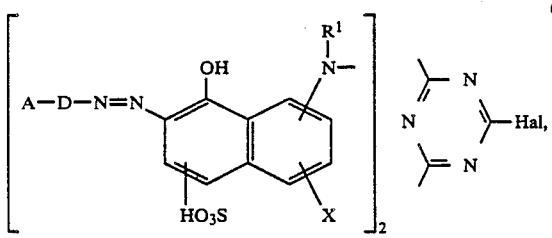 | 4 | Yellowish red |
| 52 | | 4 | Yellowish red |

We claim:

1. A reactive dye which possesses three reactive groups and conforms to the formula I $$\left[ A-D-N=N-\underset{HO_3S}{\underset{|}{\bigodot}}\underset{X}{\overset{OH}{\bigodot}}\overset{R^1}{\underset{N}{\bigodot}}\underset{Hal}{\overset{N}{\bigvee}}\right]_2 \quad (I)$$

where
R¹ is hydrogen, methyl or ethyl,
X is hydrogen or hydroxysulfonyl,

Hal is fluorine or chlorine,
D is phenylene, carboxyl- or hydroxysulfonyl-monosubstituted or -disubstituted phenylene or hydroxysulfonyl-monosubstituted or -distubstituted naphthylene, and
A is a reactive group which reacts only substitutively with the hydroxyl- or nitrogen-containing groups of the substrates to be treated, or A—D together are a benzofused reactive group which reacts only substitutively with the hydroxyl- or nitrogen-containing groups of the substrates to be treated, said reactive group selected from the group consisting of 1,3,5-triazine, quinoxaline, phthalazine, pyrimidine, pyridazone and benzothiozole.

2. A reactive dye as claimed in claim 1, which conforms to the formula Ia

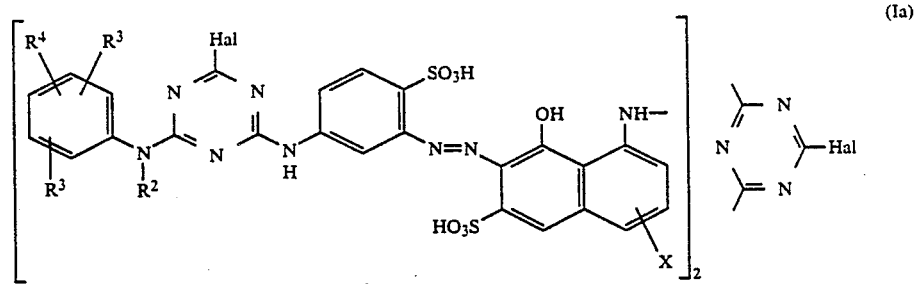

where
Hal is fluorine or chlorine,
R² is hydrogen or C₁-C₄-alkyl,
X is hydrogen of hydroxysulfonyl,
R³ is hydrogen, C₁-C₄-alkyl or C₁-C₄-alkoxy and
R⁴ is hydrogen, C₁-C₄-alkyl or hydroxysulfonyl.

3. A reactive dye as claimed in claim 1, which conforms to the formula Ib

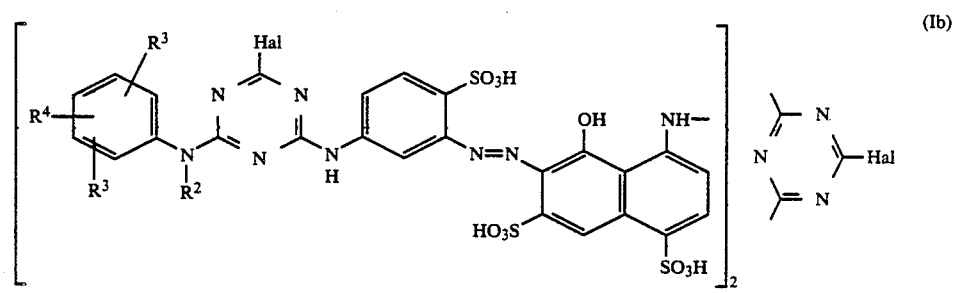

wherein
R² is hydrogen or C₁-C₄-alkyl;
R³ is hydrogen, C₁-C₄-alkyl or C₁-C₄-alkoxy;
R⁴ is hydrogen, C₁-C₄-alkyl or hydroxy sulfonyl;
Hal is fluorine or chlorine.